United States Patent
Ketcham (10) Patent No.: US 10,186,335 B2
(45) Date of Patent: Jan. 22, 2019

(54) UNDER VESSEL AUTOMATED WORK PLATFORM ASSEMBLY

(71) Applicant: Westinghouse Electric Company LLC, Cranberry Township, PA (US)

(72) Inventor: David Platt Ketcham, Charlotte, NC (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 583 days.

(21) Appl. No.: 14/798,730

(22) Filed: Jul. 14, 2015

(65) Prior Publication Data

US 2017/0018321 A1 Jan. 19, 2017

(51) Int. Cl.
| | |
|---|---|
| *G21C 19/02* | (2006.01) |
| *G21C 19/20* | (2006.01) |
| *G21C 19/19* | (2006.01) |
| *G21C 17/007* | (2006.01) |
| *G21C 17/013* | (2006.01) |
| *G21C 17/017* | (2006.01) |
| G21C 7/12 | (2006.01) |

(52) U.S. Cl.
CPC ......... *G21C 19/207* (2013.01); *G21C 17/007* (2013.01); *G21C 17/013* (2013.01); *G21C 17/017* (2013.01); *G21C 19/02* (2013.01); *G21C 19/19* (2013.01); *G21C 7/12* (2013.01)

(58) Field of Classification Search
CPC .. G21C 19/207; G21C 17/007; G21C 17/013; G21C 17/017; G21C 19/02; G21C 19/19; G21C 7/12
USPC ........................... 376/260, 268, 271; 182/128
See application file for complete search history.

(56) References Cited

U.S. PATENT DOCUMENTS

| | | | | |
|---|---|---|---|---|
| 3,960,242 A | * | 6/1976 | Saxonmeyer ............. | E04G 1/36 376/260 |
| 4,292,133 A | * | 9/1981 | Sasaki .................. | G21C 19/207 376/260 |
| 4,973,443 A | * | 11/1990 | Larson ..................... | G21C 7/12 376/260 |

(Continued)

FOREIGN PATENT DOCUMENTS

| | | |
|---|---|---|
| EP | 0774760 | 5/1997 |
| JP | 2010145119 | 7/2010 |

(Continued)

OTHER PUBLICATIONS

Westinghouse Electric Company LLC, PCT/US2016/037729, International Search Report, dated Jun. 16, 2016, 11 pages.

*Primary Examiner* — Jack W Keith
*Assistant Examiner* — Daniel Wasil
(74) *Attorney, Agent, or Firm* — Joseph C. Spadacene; Westinghouse Electric Company LLC (57) ABSTRACT

An automated high speed under vessel work platform with three automated axes comprising a 360° rotational horizontal axis, a linear horizontal axis via a traversing trolley, and a linear vertical axis via swappable task robots, which can also add fourth and fifth axes capabilities. The automated high speed under vessel work platform has the ability to drive to a specific location by typing the core location into the control software. The work platform can be operated manually via a hand wheel, or locally via a handheld pendant or from the control room. The work platform also has a camera for inspections and verification of the work.

8 Claims, 12 Drawing Sheets

(56) References Cited

U.S. PATENT DOCUMENTS

| | | | | |
|---|---|---|---|---|
| 5,351,621 A | * | 10/1994 | Tanaka | B61B 13/04 |
| | | | | 104/94 |
| 5,644,607 A | * | 7/1997 | Iwama | G21C 19/18 |
| | | | | 376/268 |
| 2007/0146480 A1 | * | 6/2007 | Judge | G21C 17/013 |
| | | | | 348/83 |
| 2011/0069802 A1 | | 3/2011 | Ketcham et al. | |
| 2011/0216870 A1 | * | 9/2011 | Johnson | G01D 5/2515 |
| | | | | 376/258 |
| 2011/0219609 A1 | | 9/2011 | Ketcham et al. | |
| 2012/0069947 A1 | | 3/2012 | Ketcham et al. | |
| 2014/0271050 A1 | * | 9/2014 | Weaver | H01L 21/67196 |
| | | | | 414/217 |
| 2015/0234083 A1 | * | 8/2015 | Mariella | G01V 5/0091 |
| | | | | 250/395 |

FOREIGN PATENT DOCUMENTS

| | | |
|---|---|---|
| JP | 2013044681 | 3/2013 |
| WO | 2012039940 | 3/2012 |

* cited by examiner

UNDER VESSEL AUTOMATED WORK PLATFORM ASSEMBLY

BACKGROUND

1. Field

This invention relates generally to maintenance of under vessel components of a nuclear reactor and more particularly to an automated high speed under vessel work platform for servicing control rod drives and other under vessel components of a boiling water reactor.

2. Related Art

Figure 1:
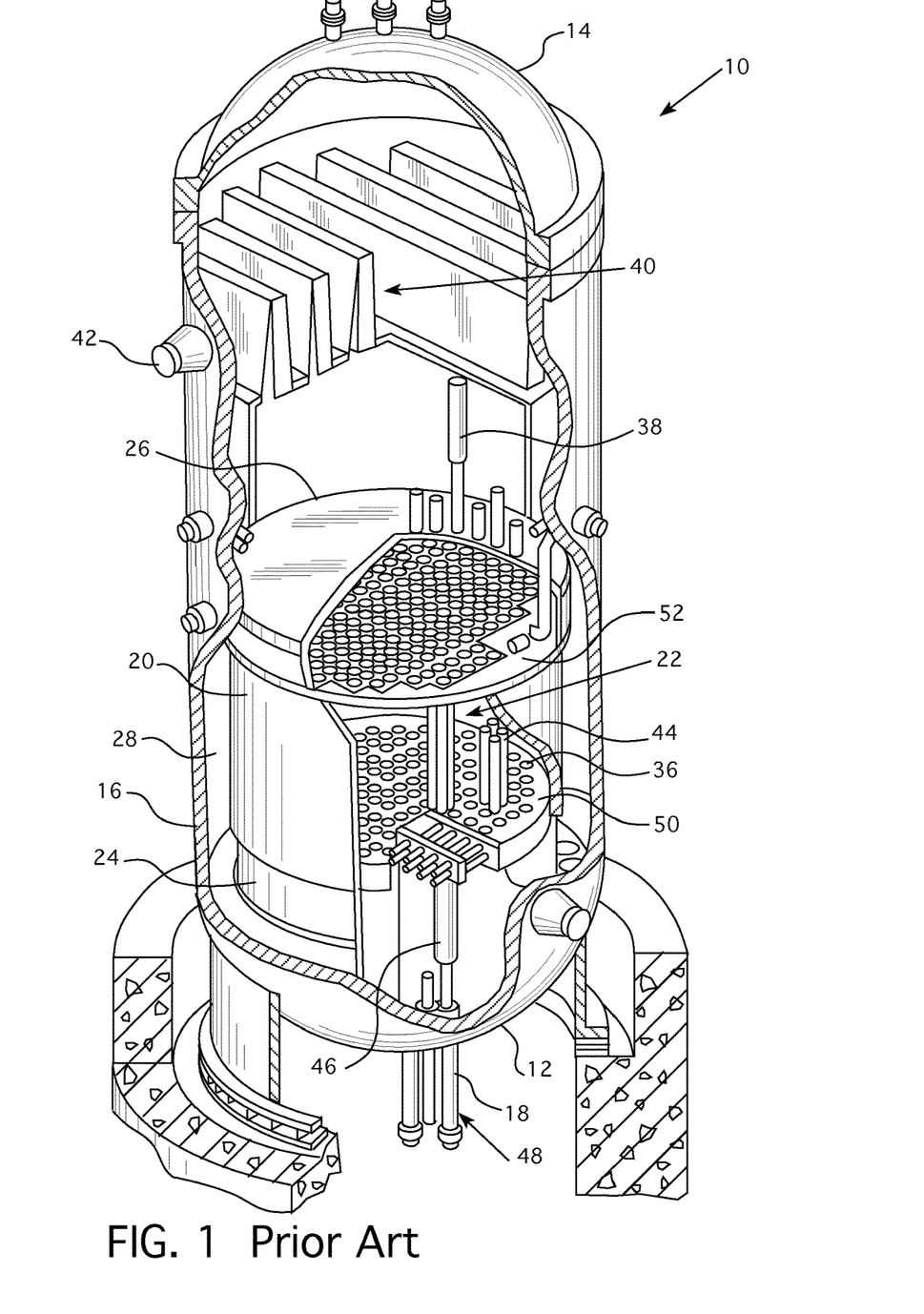
FIG. 1 is a sectional view, with parts cut away, of a boiling water nuclear reactor pressure vessel.

Control rod drives are used to position control rods in boiling water reactors to control the fission rate and fission density, and to provide adequate excess negative reactivity to shut down the reactor from any normal operating or accident condition at the most reactive time in the core life. FIG. 1 is a sectional view of a boiling water nuclear reactor pressure vessel 10 with parts cut away to expose the interior thereof and illustrates the environment in which a control rod drive operates. The reactor pressure vessel 10 has a generally cylindrical shape and is closed at one end by a fixed bottom head 12 and at its other end by a removable head 14. A sidewall 16 extends from the bottom head 12 to the top head 14. A cylindrically-shaped core shroud 20 surrounds a reactor core 22. The shroud 20 is supported at one end by a shroud support 24 and includes a removable shroud head 26 at the other end. An annulus 28 is formed between the shroud 20 and the sidewall of the vessel 16.

Heat is generated within the core 22, which includes fuel bundles 36 of fissionable material. Water circulated up through the core 22 is at least partially converted to steam. Steam separators 38 separate steam from water, which is recirculated. Residual water is removed from the steam by steam dryers 40. The steam exits the pressure vessel 10 through a steam outlet 42 near the vessel top head 14 and is commonly used to drive a turbine generator for the production of electricity.

The fuel bundles 36 are aligned by a lower core plate 50 located at the base of the core 22. A top guide 52 aligns the fuel bundles 36 as they are lowered into the core 22. Core plate 50 and top guide 52 are supported by the core shroud 20.

The amount of heat generated in the core 22 is regulated by inserting and withdrawing control rods 44 of neutron absorbing material, such as Hafnium. The control rods extend from underneath the vessel to within the core. To the extent that the control rods 44 are inserted between the fuel bundles 36, the control rods absorb neutrons that would otherwise be available to promote the chain reaction which generates heat in the core 22. The control rod guide tubes 46 below the lower core plate 50, align the vertical motion of the control rods 44 during insertion and withdrawal. Hydraulic control rod drives 48, which extend through the bottom head 12, effect the insertion and withdrawal of the control rods 44. Each control rod drive is mounted vertically in a control rod drive housing 18 which is welded to a stud tube which, in turn, is welded to the bottom head of the reactor vessel 12. A control rod drive flange is bolted and sealed to the flange of the control rod drive housing 18, which contains ports for attaching the control rod drive hydraulic system lines. Demineralized water supplied by the control rod drive hydraulic system serves as the hydraulic fluid for effecting control rod drive operation.

Control rod drives are frequently removed from the reactor for servicing in order to maintain their reliability. All boiling water reactors use the same under vessel platform that was installed during original construction for servicing the control rods. The existing platforms are slow and can only be controlled by a technician under the vessel while on the platform using a hand pendant running to an air motor or electric AC motor. The only alternative is via a manually operated hand wheel. Besides being slow, the existing work platforms require under vessel technicians to take their mind off their tasks, in order to properly position a platform often causing setup under the wrong location. Due to this condition, and the operational process of the existing work platforms, many errors, close calls and equipment damage take place during planned outages. Accordingly, a new under vessel work environment is desired that will facilitate remote operation, new service techniques and a more efficient service operating environment.

SUMMARY

These and other objects are achieved by an under vessel automated work platform assembly for remotely servicing a lower portion of the vessel. The platform assembly includes a horizontal, generally circular work platform extending in a first plane and a generally circular rail extending in a second plane, substantially parallel to the first plane, with the rail supporting an orbital track on which the work platform is rotationally supported to rotate the work platform in the first plane. A remotely controlled motor rotates the work platform on the orbital track and a linear track extends across the diameter of the work platform. A carriage is remotely movable on the linear track across the diameter of the work platform. A robot attaches to the carriage and is moveable therewith. The robot has a vertically extending member moveable in a direction perpendicular to the first plane and has a receptacle proximate a distal end of the vertically extending member for supporting a tool. Preferably, the under vessel automated work platform assembly includes a hand wheel for manually moving the work platform around the orbital track as an alternative to the remotely controlled motor. In one embodiment, the robot is a swappable task robot and the work platform supports a camera generally focused on a distal end of the vertically extending member on the robot. Preferably, the camera is configured to have a remote controlled panning capability.

In another embodiment, where the vessel is a nuclear reactor vessel having a nuclear core, the remotely controlled motor for moving the work platform on the automated work platform assembly and the remotely controlled carriage are configured to communicate with a controller and are responsive to coordinates of the reactor core inputted to the controller to move the vertically extending member under a core position associated with the coordinates.

Preferably, the nuclear reactor vessel includes a refueling bridge configured to be positioned over the nuclear core and move one or more pieces of the refueling equipment over the nuclear core to directed ones of the coordinates inputted at a refueling system command station, wherein the controller and the refueling system command station automatically coordinate so that the refueling bridge and the controller do not address the same coordinates at the same time.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

The automated high speed under vessel work platform of this invention will be used to perform boiling water reactor under vessel maintenance and repair work remotely, without the need of personnel under the vessel. The system will perform these work activities more precisely, more accurately and faster, as well as offer concurrent verification at the time of the activity via the use of on-board high definition cameras. The automated high speed under vessel work platform has three automated axes consisting of a 360° rotational horizontal axis, a linear horizontal axis via a traversing trolley (also referred to as a carriage) and a linear vertical axis via swappable task robots which can also contain fourth and fifth axes capabilities. The swappable task robots may be attached by personnel or stored under the vessel and retrieved by the remotely operated horizontal trolley. Another advantage of the automated high speed under vessel work platform is the ability to automatically drive to a specific location merely by typing the core location into the control software. The automated high speed under vessel work platform has the capability to also be operated manually via a hand wheel and locally via a handheld pendant. The task robots will perform tasks such as shootout steel inspection, all other visual inspections, tag hanging, concurrent verifications, position indication probe removal, control rod drive uncoupling, control rod drive de-torqueing, control rod drive re-torqueing, and local power range monitor disengagement, local power range monitor drain can installation removal and control as well as control rod drive exchange.

Figure 2:
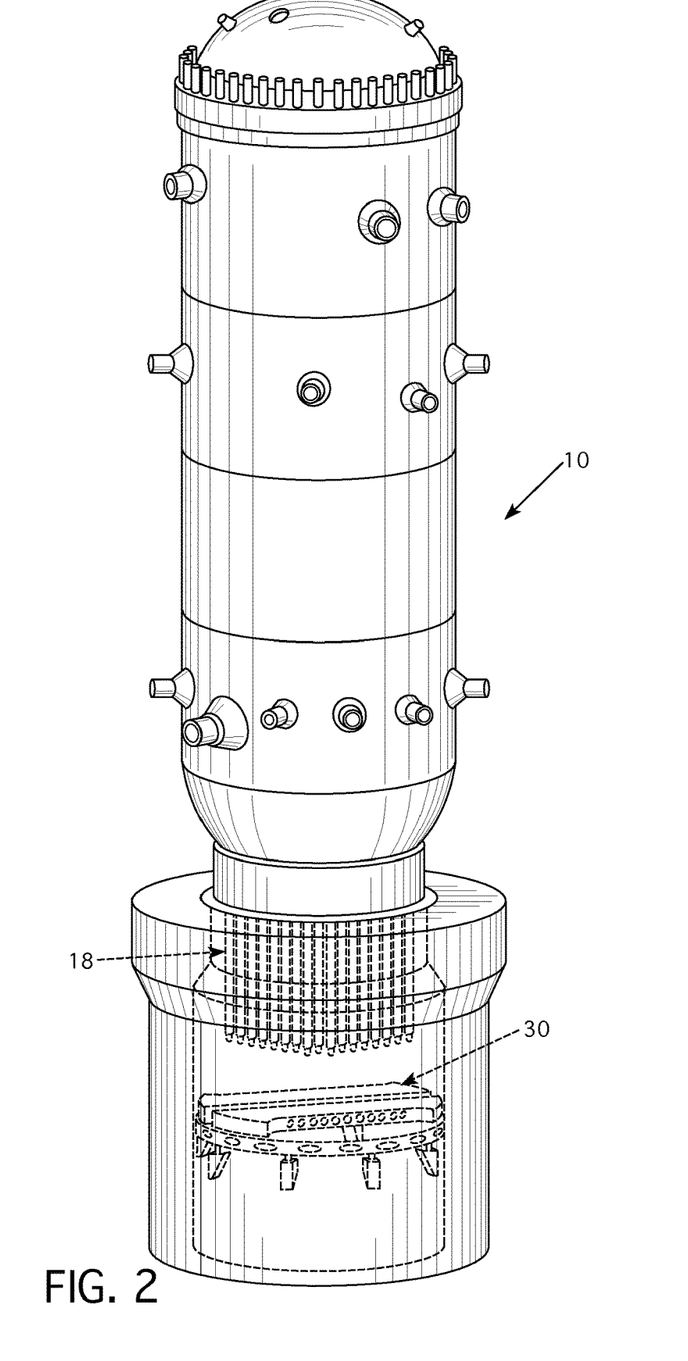
FIG. 2 is a perspective view of the nuclear reactor pressure vessel shown in FIG. 1 with the work platform of this invention installed underneath the reactor vessel.
Figure 3:
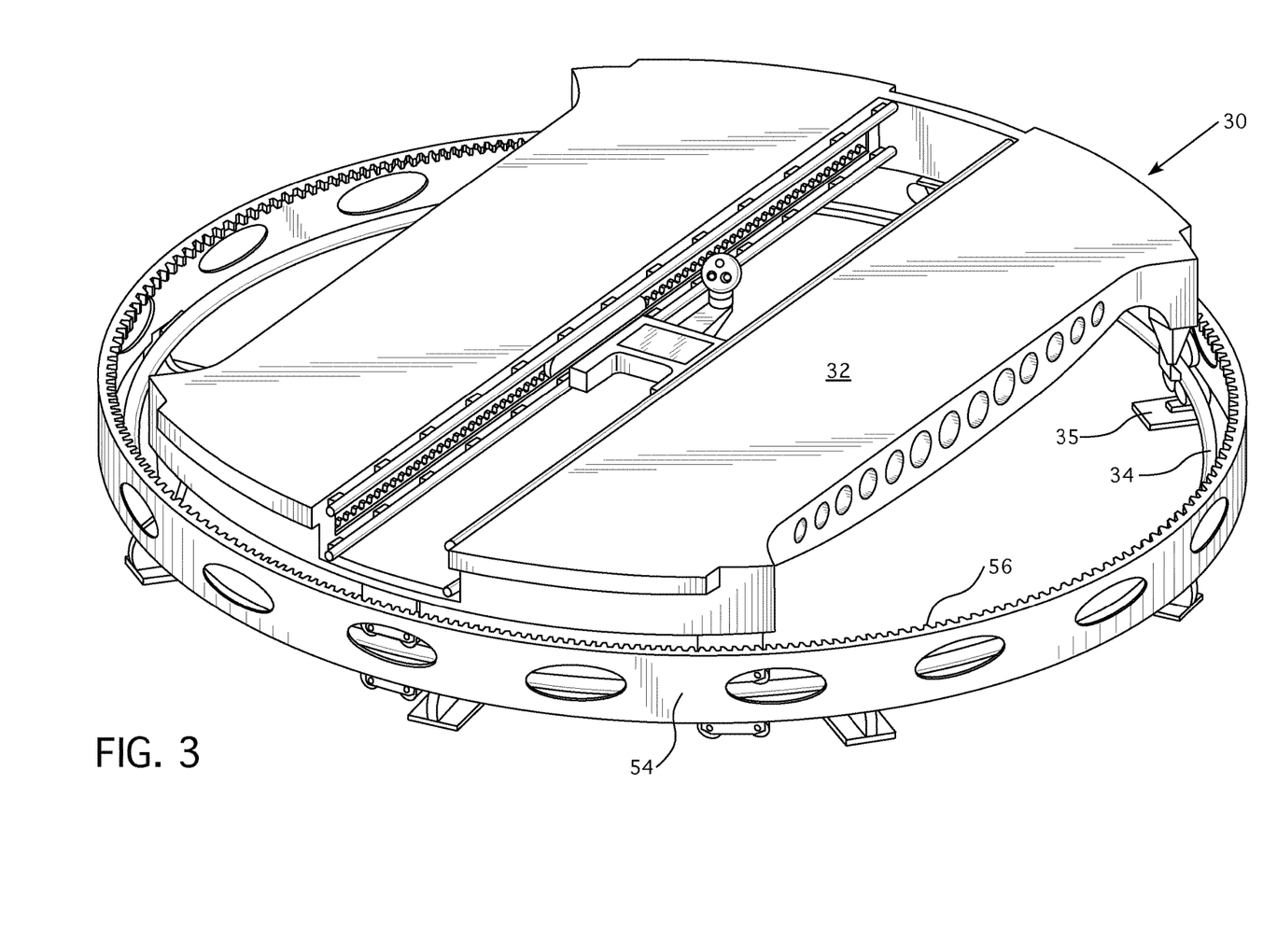
FIG. 3 is a perspective view of the work platform of this invention.
Figure 4:
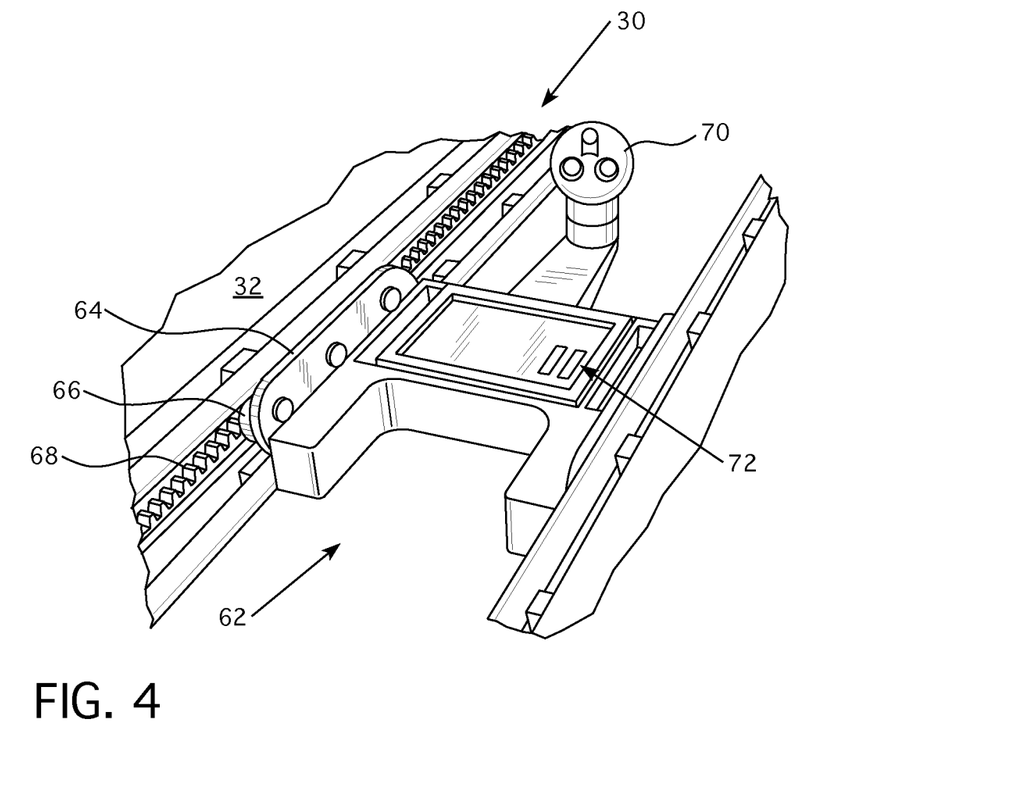
FIG. 4 is an enlarged view of the horizontal automated trolley illustrated in FIG. 3.
Figure 5:
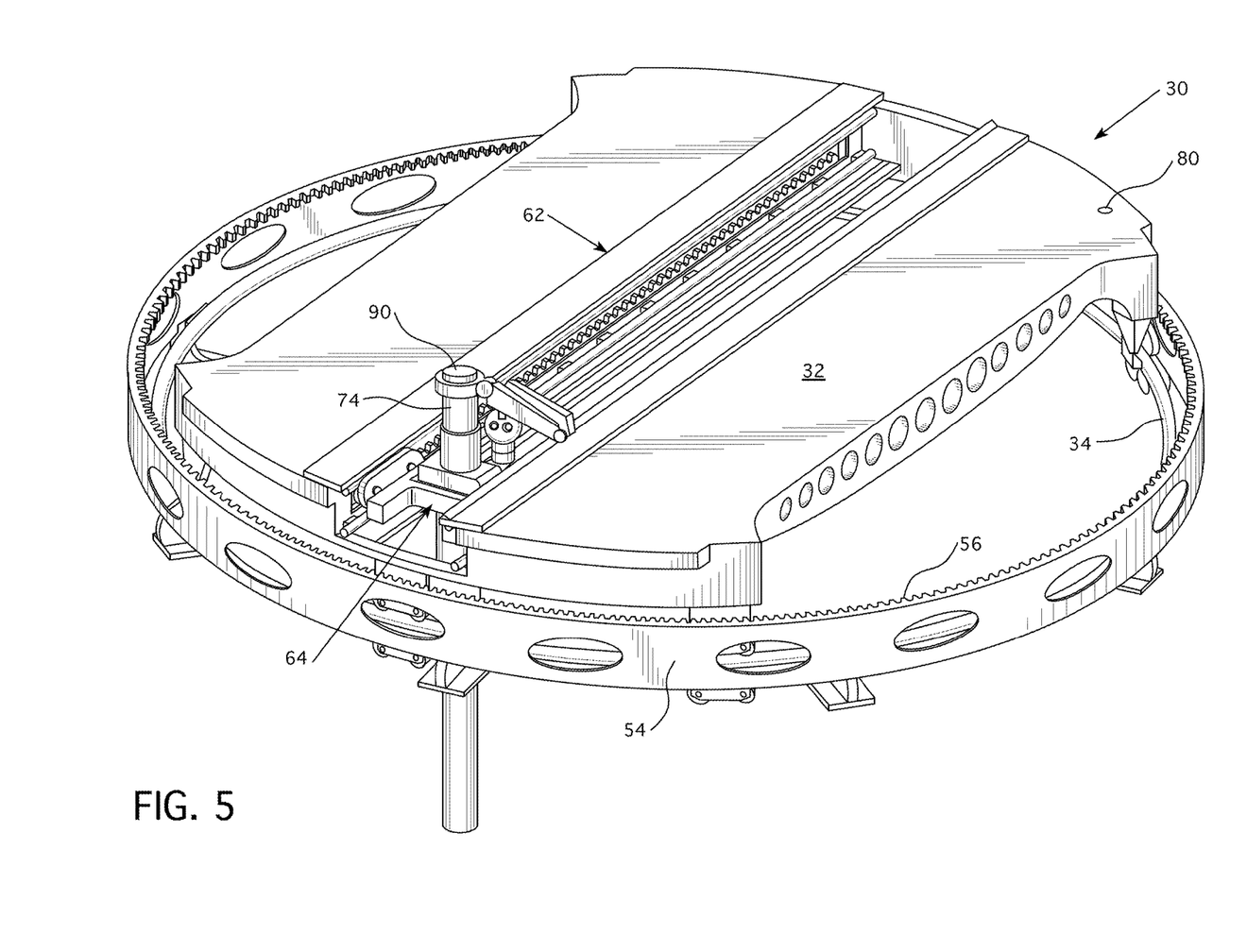
FIG. 5 is a perspective view of the work platform shown in FIG. 3 with a swappable task robot shown connected to the horizontal automated trolley.
Figure 6:
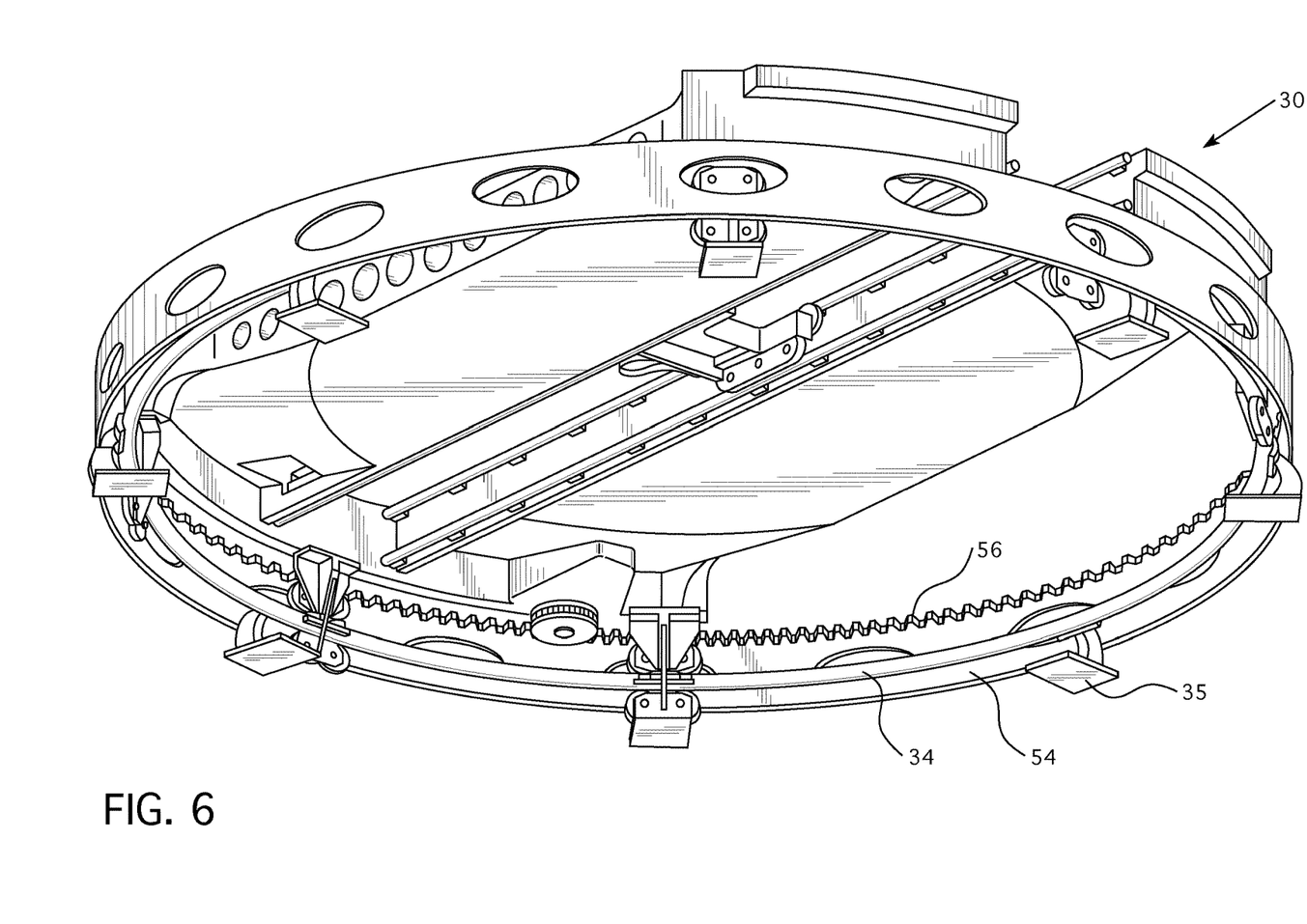
FIG. 6 is a perspective view of the underside of the work platform shown in FIG. 3.
Figure 7:
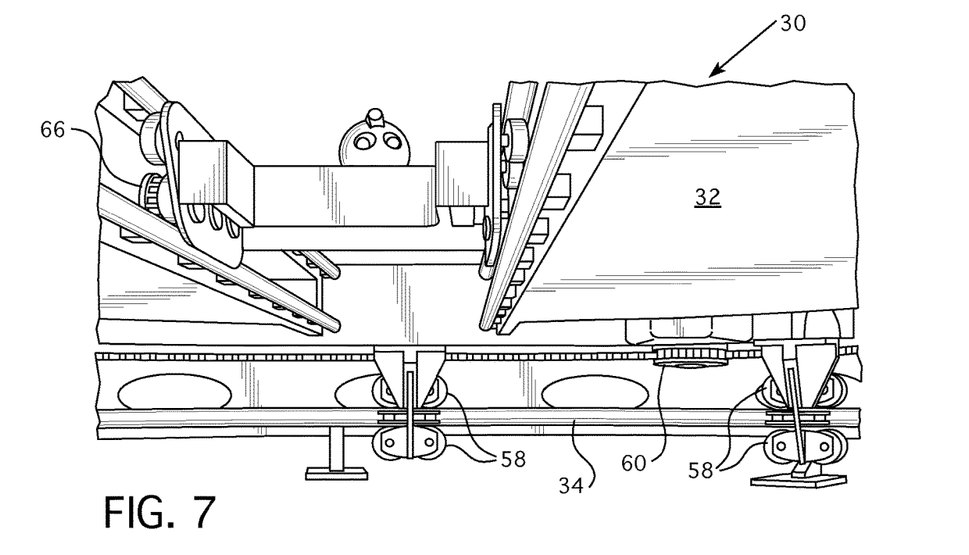
FIG. 7 is an enlarged view of a portion of FIG. 6 showing the automated horizontal trolley drive on the linear track and the precision positive captive trucks riding on the orbital track.
Figure 8:
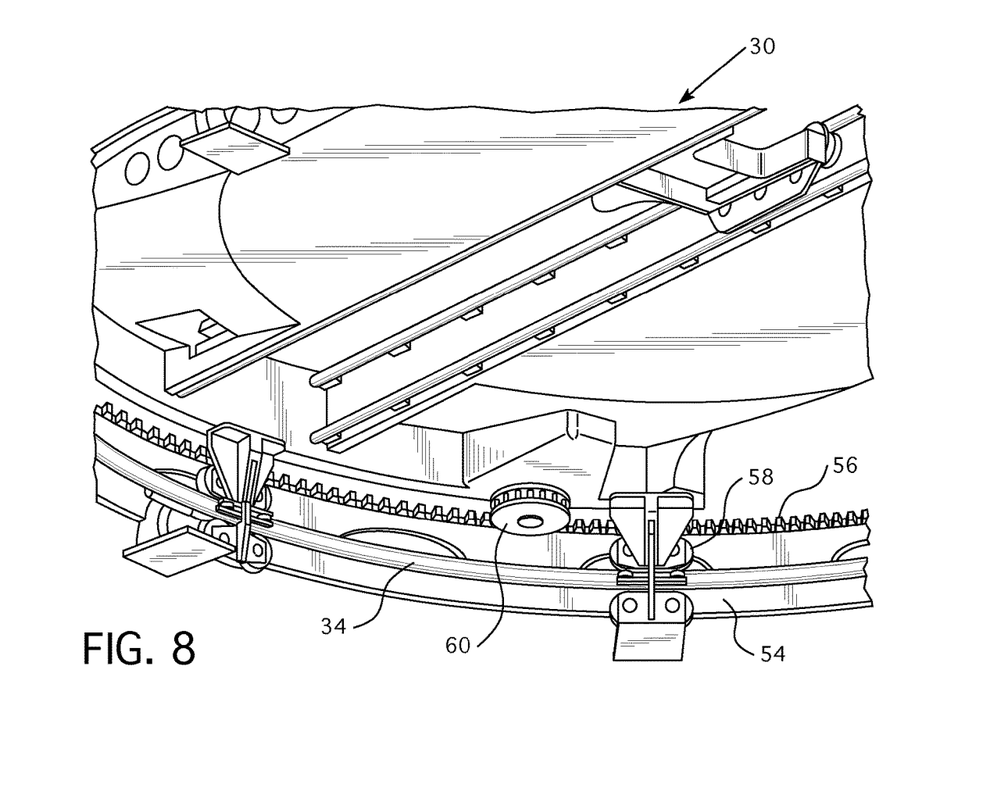
FIG. 8 is an enlarged view of a second portion of FIG. 6 that shows a better view of the rotational drive on the circumferentially drive ring.
Figure 9:
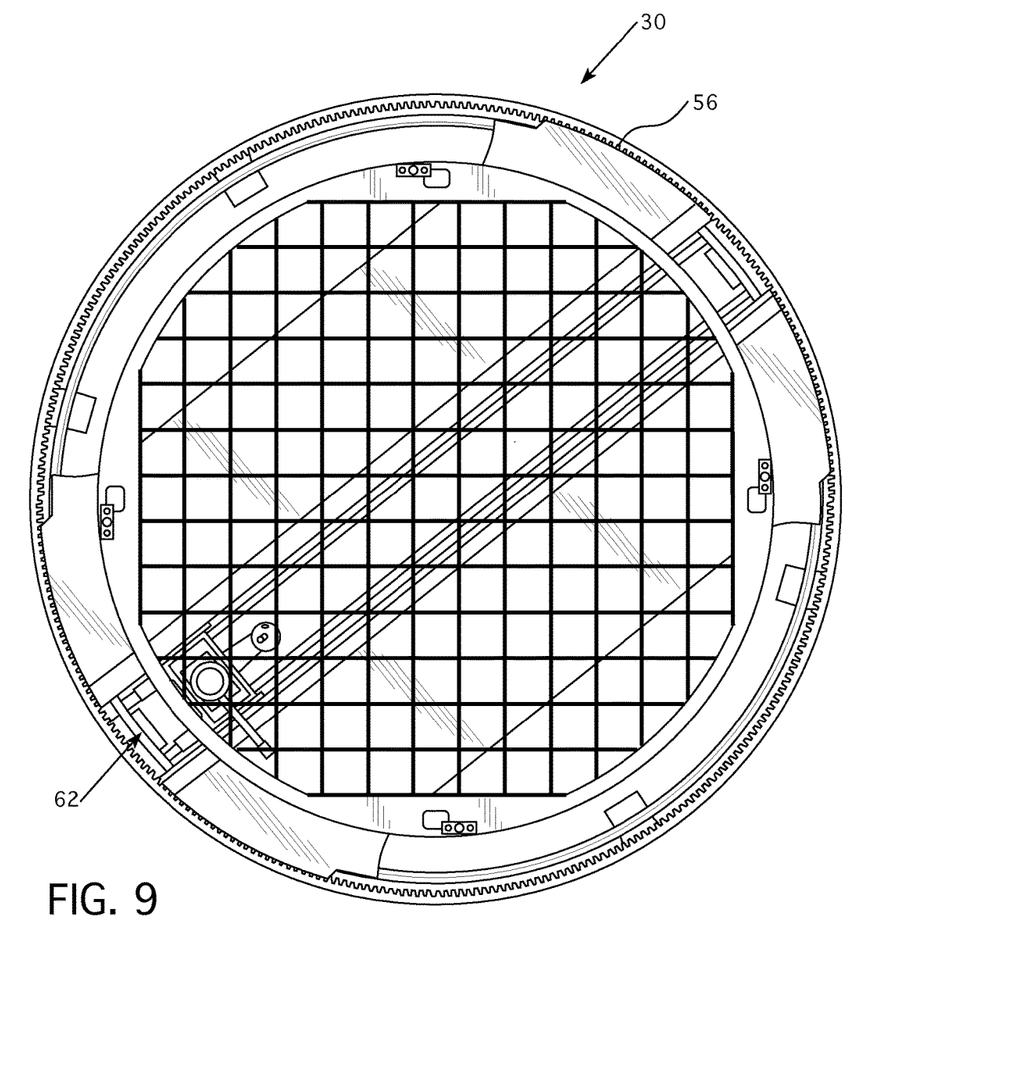
FIG. 9 is a plan view of the work platform of this invention with a schematic representation of the core locations that the horizontal automated trolley can be programmed to locate under.
Figure 13:
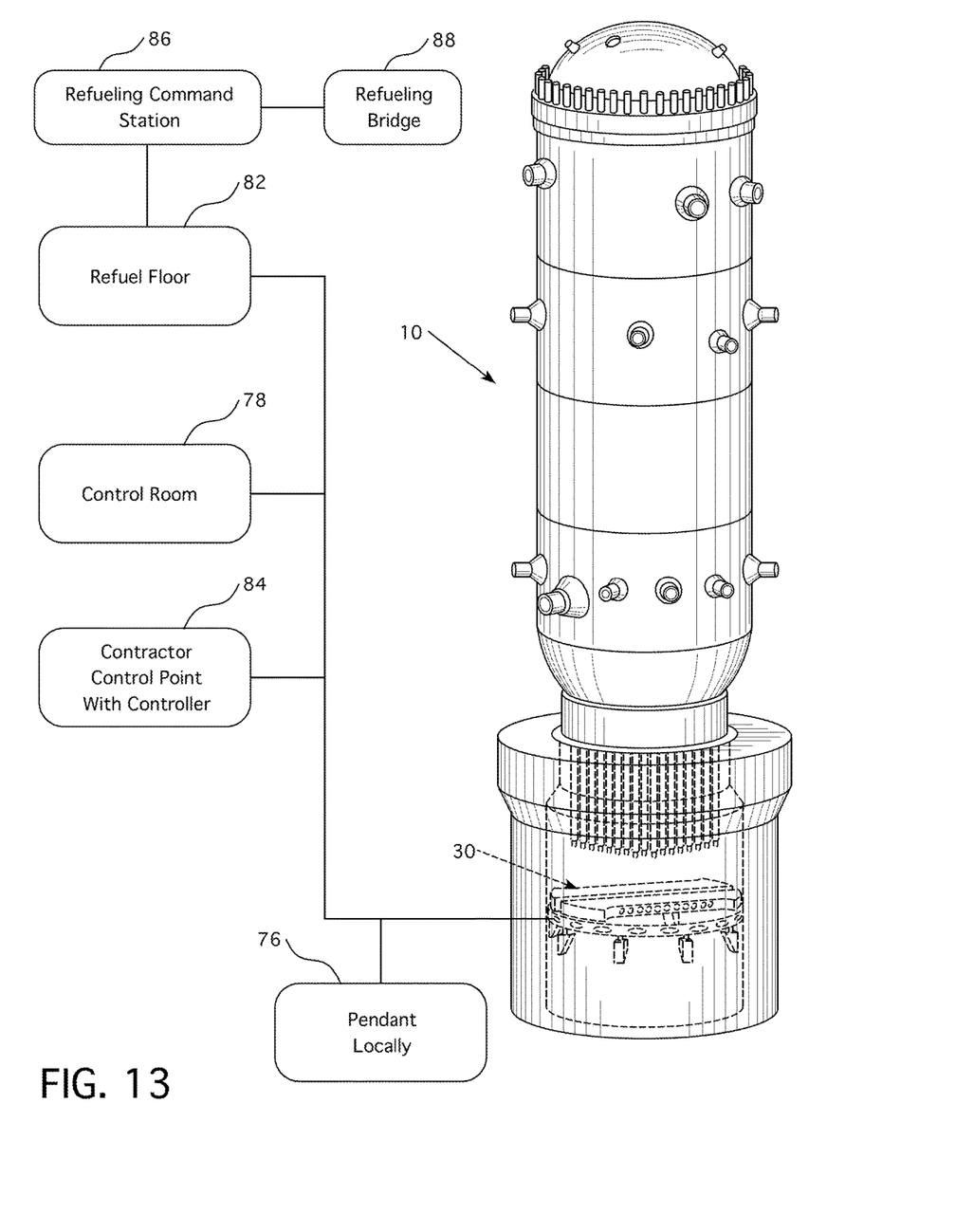
FIG. 13 is the perspective view of the reactor vessel shown in FIG. 3 schematically showing two optional methods of control for the robotic platform of this invention.

FIG. 2 shows a perspective view of the reactor previously shown in FIG. 1 with the under vessel work platform 30 supported below the control rod drives 18. The work platform 30 can be better appreciated from the views shown in FIGS. 3-8. The under vessel work platform assembly 30 has an orbital track 34 attached circumferentially to under vessel track mount locations 35. The orbital track 34 has a circumferential drive ring 54 having gear teeth 56. The work platform 32 is attached to the orbital track 34 via precision positive captive trucks 58 which can be best observed in FIGS. 7 and 8. The captive trucks allow for load transfers to the work platform 32 in any direction. The work platform 32 has an electrically powered rotational drive 60 comprising a pin gear which interfaces with the gear teeth 56 of the circumferential drive ring 54 allowing for 360° platform rotation. The work platform 32 has a linear track system 62 comprising a horizontal automated trolley 64 as can best be appreciated from FIGS. 4-8. The horizontal automated trolley 64 has an electrically powered drive 66 comprising a pin gear which interfaces with a gear rack 68 horizontally mounted within the work platform 32. With the circumferential axis and the horizontal axis, the horizontal automated trolley 64 can be remotely positioned at any location under the vessel. The automated horizontal trolley 64 has a remotely operated high definition camera 70 and spring-loaded power and position feedback pins 72. The pins 72 provide power to and feedback from swappable automated task robots 74 which are designed to be inserted into the automated horizontal trolley 64 as illustrated in FIG. 5. The automated task robots 74 perform a variety of work tasks on under vessel components as well as simple tasks such as hanging tags, operating valves, and concurrent verifications via visual observation through the camera 70. As can be seen in FIG. 13, this entire system can be operated locally through a pendant 76, at a contractor control point with a controller 84 or remotely through the control room 78. The controller 84 communicates with a refueling system command station 86 on the refueling floor 82 so the refueling bridge 88 and the under vessel work platform 32 are each aware of each other's location relative to the core so the proper work processes can be adhere to. Preferably the refueling floor 82 monitors the position of the trolley 64 on the work platform 32, but has no control over the positioning of the trolley. The control room 78 can control the cameras and monitor the position of the work platform 32. The controller 84 has both a view of the camera feed as well as complete control of the work platform assembly 30 and the pendant 76 can control the entire movement of the work platform assembly 30. As figuratively illustrated in FIG. 9, by typing a cell location into the software, the automated high speed under vessel work platform can automatically move to that cell location; eliminating the HuP (human performance) trap of working on the wrong location.

Figure 10:
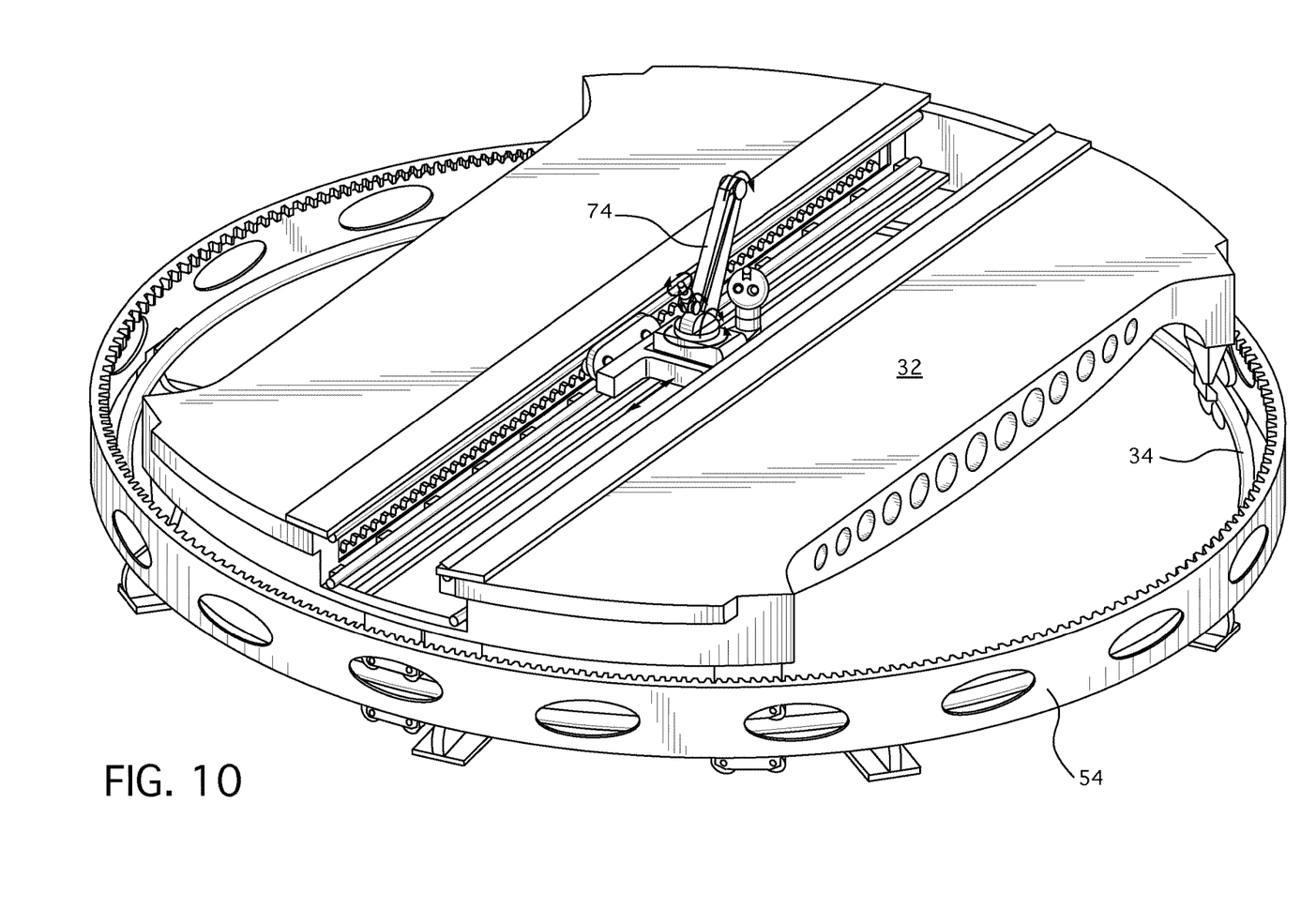
FIG. 10 is a perspective view of the work platform of this invention with one embodiment of the optional swappable task robot connected to the horizontal automated trolley that adds a third, fourth and fifth axes of movement.
Figure 11:
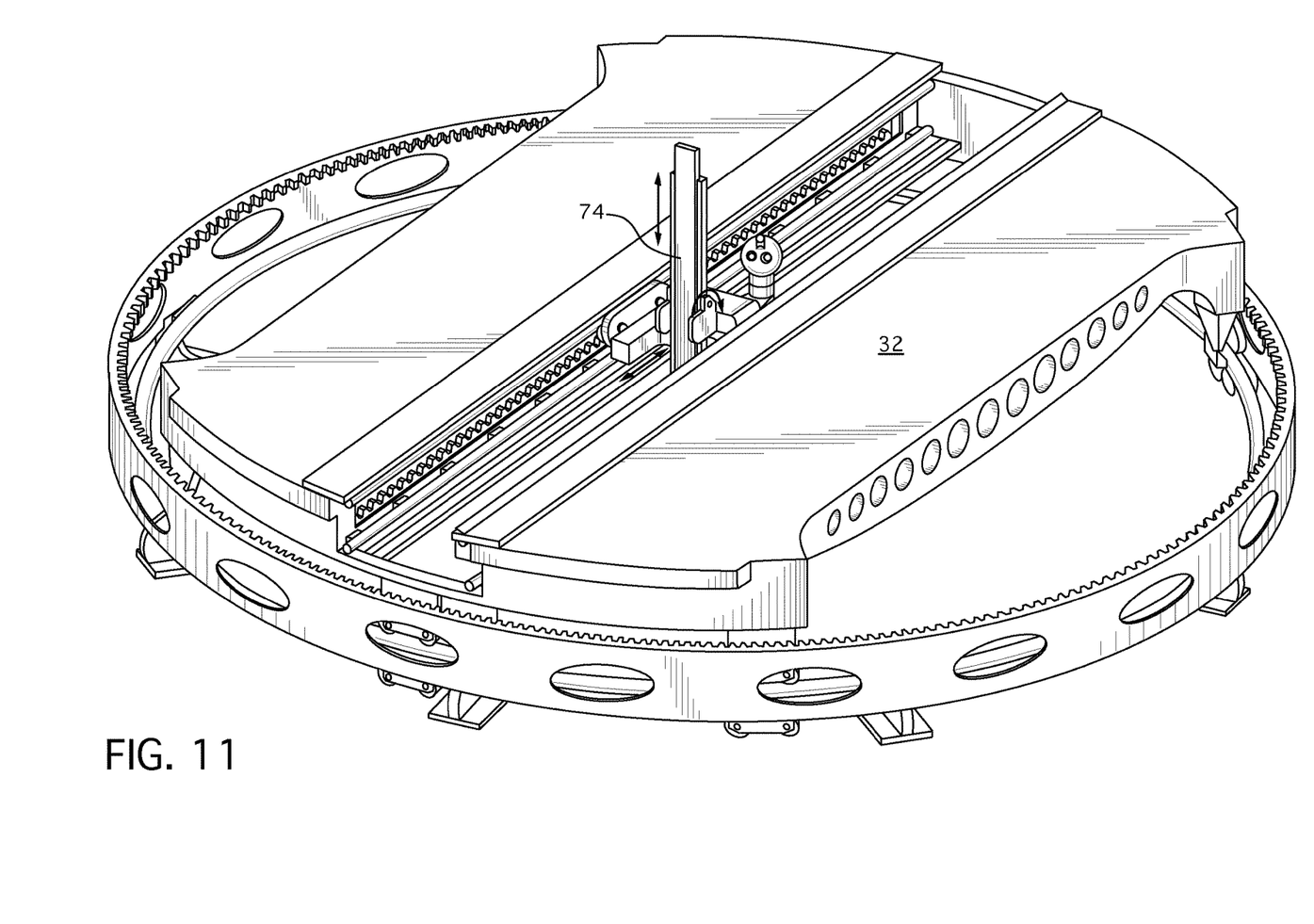
FIG. 11 is a perspective view of the work platform shown in FIG. 10 with a second embodiment of an optional swappable task robot that adds a third axis of movement, with a vertical rotational fourth axis.
Figure 12:
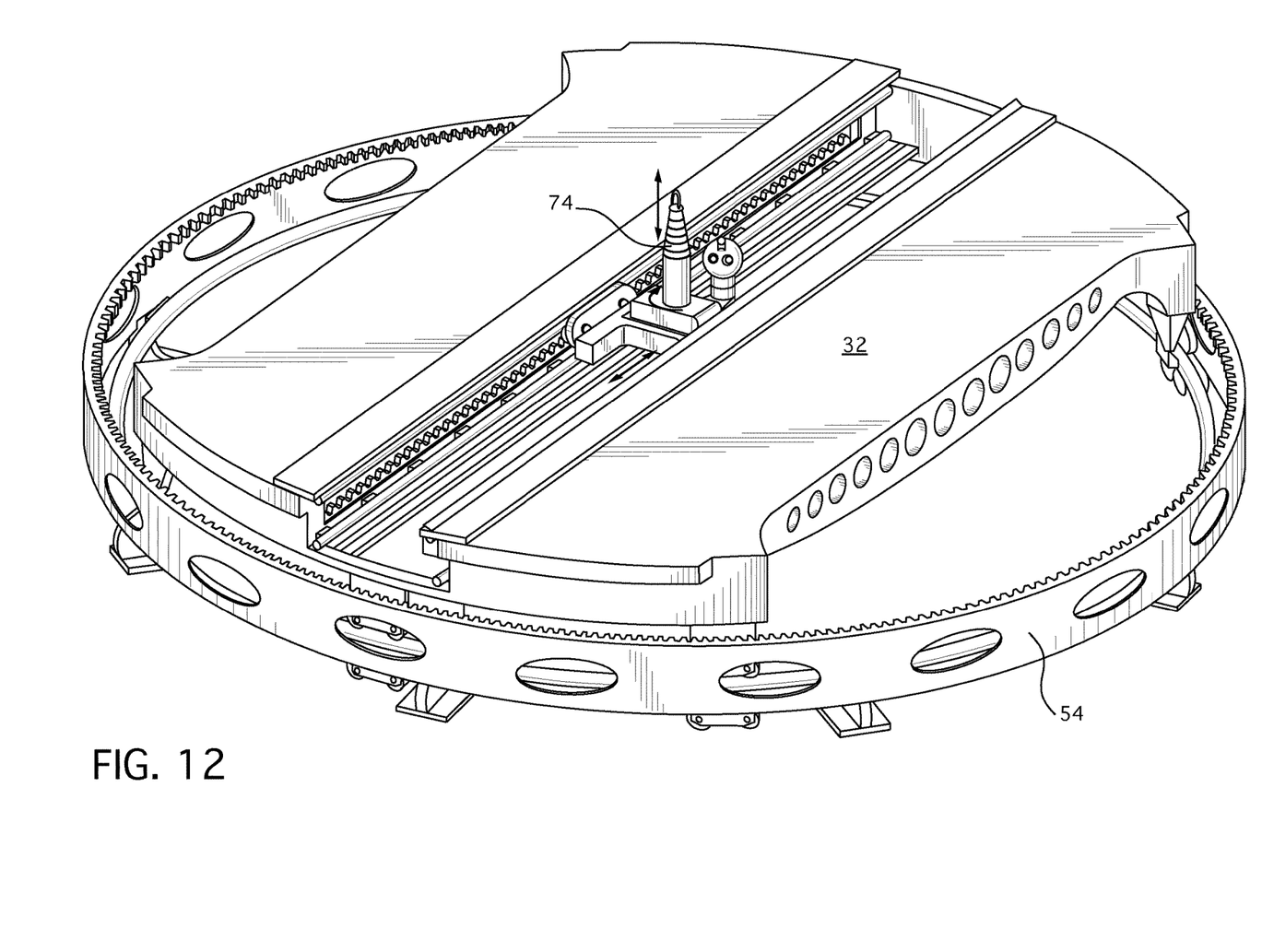
FIG. 12 is a third embodiment of the automated platform of this invention with a swappable task robot that adds a third and fourth axes of movement.

FIGS. 10, 11 and 12 show three different swappable task robots which can be used with the horizontal automated trolley 64. The robot 74 in FIG. 10 has a third, fourth and fifth axes of movement. The robot 74 illustrated in FIG. 11 adds a third axis with a vertical rotational fourth axis 90. The robot 74 illustrated in FIG. 12 adds a third and fourth axes. The axes of movement of the robots illustrated in FIGS. 10, 11 and 12 are figuratively shown by the directional arrows superimposed on those figures.

Accordingly, the under vessel work platform of this invention can be remotely operated and provide feedback to the operator of its exact location, while also providing live streaming video of the entire under vessel work area. The under vessel work platform can provide remote human inspections and scans of the entire under vessel area via the control room or other control point without the need of setup by personnel; inspections could even take place during normal plant operation, a feature currently not available at any boiling water reactor facility. The work platform has the ability to communicate with the refueling bridge, identifying the work location of each to their operators. The work platform of this invention can drastically cut the proposed under vessel radiation dose expectations for plant outages. The platform retains the capability of manual operation through a hand wheel that can be inserted at 80 shown in FIG. 5.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An under vessel automated work platform assembly for remotely servicing a lower portion of a vessel, the platform assembly comprising:
   a horizontal generally circular work platform extending in a first plane;
   a generally circular rail extending in a second plane substantially parallel to the first plane, the rail supporting an orbital track on which the work platform is rotationally supported to rotate the work platform in the first plane and the orbital track includes a circumferential drive ring having gear teeth and extending in a third plane substantially parallel to the second plane;
   a pin gear structured to interact with the gear teeth of the circumferential drive;
   a remotely controlled motor for rotating the work platform on the orbital track by driving the pin gear;
   a linear track extending across a diameter of the work platform;
   a remotely controlled carriage moveable on the linear track across the diameter of the work platform;
   an automated tool programed to perform at least part of a reactor maintenance task, attached to the remotely controlled carriage and moveable therewith, the automated tool having a vertically extending member moveable in a direction perpendicular to the first plane; and
   a controller for remotely inputting an in-vessel cell coordinate and automatically positioning the automated tool under the in-vessel cell coordinate by controlling the rotation of the work platform on the orbital track and movement of the remotely controlled carriage on the linear track.

2. The under vessel automated work platform assembly of claim 1 including a hand wheel for manually moving the work platform around the orbital track.

3. The under vessel automated work platform assembly of claim 1 wherein the automated tool is a swappable task robot.

4. The under vessel automated work platform assembly of claim 1 wherein the automated work platform assembly is sized to fit under the vessel.

5. The under vessel automated work platform assembly of claim 1 wherein the work platform supports a camera generally focused on the distal end of the vertically extending member.

6. The under vessel automated work platform assembly of claim 5 wherein the camera has a remote controlled panning capability.

7. The under vessel automated work platform assembly of claim 5 wherein the camera has a remote controlled tilt capability.

8. The under vessel automated work platform assembly of claim 1 for servicing a nuclear reactor having a nuclear core and a refueling system command station for refueling the core, and the remotely controlled motor and the remotely controlled carriage are structured to communicate with the controller that is structured to control the rotation of the work platform and the movement of the remotely controlled carriage and provide an output identifying a position of the remotely controlled carriage in a form that can be received and understood by the refueling system command station so the refueling system command station is notified of the position of the remotely controlled carriage so that proper work processes can be adhered to.

* * * * *